United States Patent [19]

Hiraguchi

[11] Patent Number: 4,792,940
[45] Date of Patent: Dec. 20, 1988

[54] AUTOMATIC RETRAIN METHOD FOR A FULL DUPLEX MODEM HAVING AN ECHO CANCELLER AND AN EQUALIZER

[75] Inventor: Masayoshi Hiraguchi, Tokyo, Japan

[73] Assignee: NEC Corporation, Tokyo, Japan

[21] Appl. No.: 941,868

[22] Filed: Dec. 15, 1986

[30] Foreign Application Priority Data

Dec. 13, 1985 [JP] Japan .................................. 60-280367

[51] Int. Cl.$^4$ ............................................. H04L 5/14
[52] U.S. Cl. ...................................... 370/32.1; 375/8; 375/13
[58] Field of Search .............. 375/8, 13; 370/32, 32.1, 370/24

[56] References Cited

U.S. PATENT DOCUMENTS

| | | |
|---|---|---|
| 4,044,307 | 8/1977 | Borysiewicz et al. ................. 375/13 |
| 4,077,021 | 2/1978 | Csajka et al. ............................ 332/9 |
| 4,394,767 | 7/1983 | Shum ..................................... 375/13 |
| 4,669,090 | 5/1987 | Betts et al. ............................. 375/13 |
| 4,694,450 | 9/1987 | Staab ................................... 370/32.1 |

OTHER PUBLICATIONS

Sondhi and Berkley, "Silencing Echoes on the Telephone Network," *Proceedings of the IEEE*, vol. 68, No. 8, Aug. 1980, pp. 948-963.
Consultative Committee for International Telegraph and Telephone, "Recommendation " v. 32, 1984, pp. 221-238.

*Primary Examiner*—Robert L. Griffin
*Assistant Examiner*—Marianne Huseman
*Attorney, Agent, or Firm*—Sughrue, Mion, Zinn, Macpeak, and Seas

[57] ABSTRACT

The invention relates to an automatic retrain method applicable to full duplex data transmission modems which shortens the conventional protocol for retraining in the instance where signal reception can be improved by retraining only the automatic equalizers of the linked modems. If the retrain-initiating modem fails to detect a retrain signal from the linked modem within a predetermined time after transmitting its own retrain signal, the conventional retraining protocol is then adopted in order to retrain both the echo cancellers and the automatic equalizers of the linked modems.

5 Claims, 2 Drawing Sheets

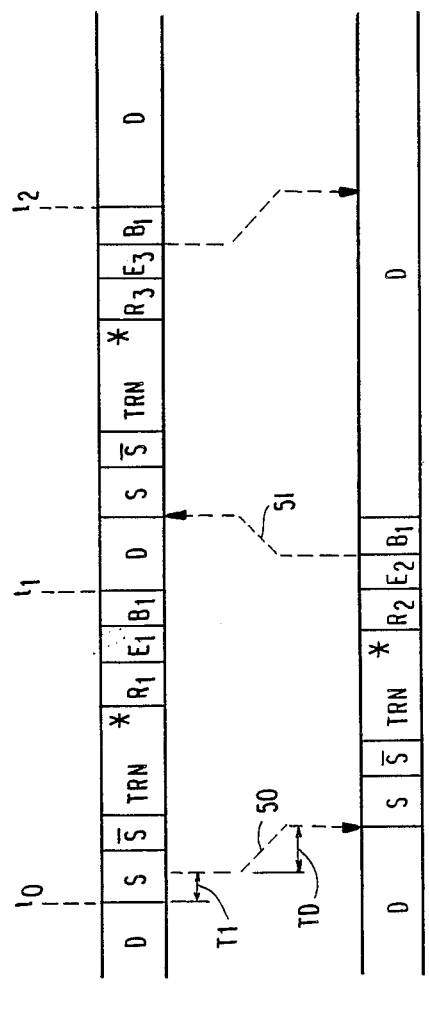

AUTOMATIC RETRAIN METHOD FOR A FULL DUPLEX MODEM HAVING AN ECHO CANCELLER AND AN EQUALIZER

BACKGROUND OF THE INVENTION

This invention relates to an automatic retrain method for full duplex modems having an echo canceller and an equalizer.

When signal receiving conditions deteriorate during data transmssion between the prior art full duplex modems using an echo canceller (hereinafter referred to simply as modems), it is necessary to automatically retrain the echo canceller and the automatic equalizer within the modems in order to secure accurate data transmission. A retrain procedure for such a case has been proposed as Recommendation V. 32 of the Consultative Committee for International Telegraph and Telephone (CCITT). This retrain procedure, however, is defective in that it requires too much time until the resumption of data transmission because the recommended procedure always requires retraining of both the echo canceller and the automatic equalizer in the modems even if the retrain of the automatic equalizer alone would have been sufficient to permit resumption of data transmission.

SUMMARY OF THE INVENTION

An object of the invention is to obviate the aforementioned problem encountered in the prio art and to provide a retrain method for full duplex modems which can retrain an automatic equalizer alone if the retraining is necessary for the equalizer only.

According to the present invention, there is provided a retrain method for first and second modems operating in a full duplex data transmission mode, each of the first and second modems including modulating means for modulating input data to produce a modulated signal, an echo canceller for cancelling an echo produced in response to the modulated signal, an equalizer for equalizing waveform distortion produced on a received modulated signal transmitted through a transmission line, and demodulating means for demodulating the received modulated equalized signal into the input data, said retrain method comprising the steps of detecting deterioration of the received modulated signal from said first modem, suspending data transmission from said first modem in response to the detection of deterioration and transmitting, at least once, a first training signal having a predetermined pattern and time period, suspending data transmission from said second modem in response to said first training signal, and transmitting, once, a second training signal having a predetermined pattern and time period, and automatically training only said automatic equalizers of said first and second modems in response to the second and first training signals.

BRIEF DESCRIPTION OF THE DRAWINGS

The above and other objects, features and advantages of the present invention will become apparent from the following detailed description when taken with the accompanying/drawings in which:

FIGS. 2A and 2B are the charts explaining the retrain method according to this invention.

DESCRIPTION OF THE PREFERRED EMBODIMENT

Figure 1:
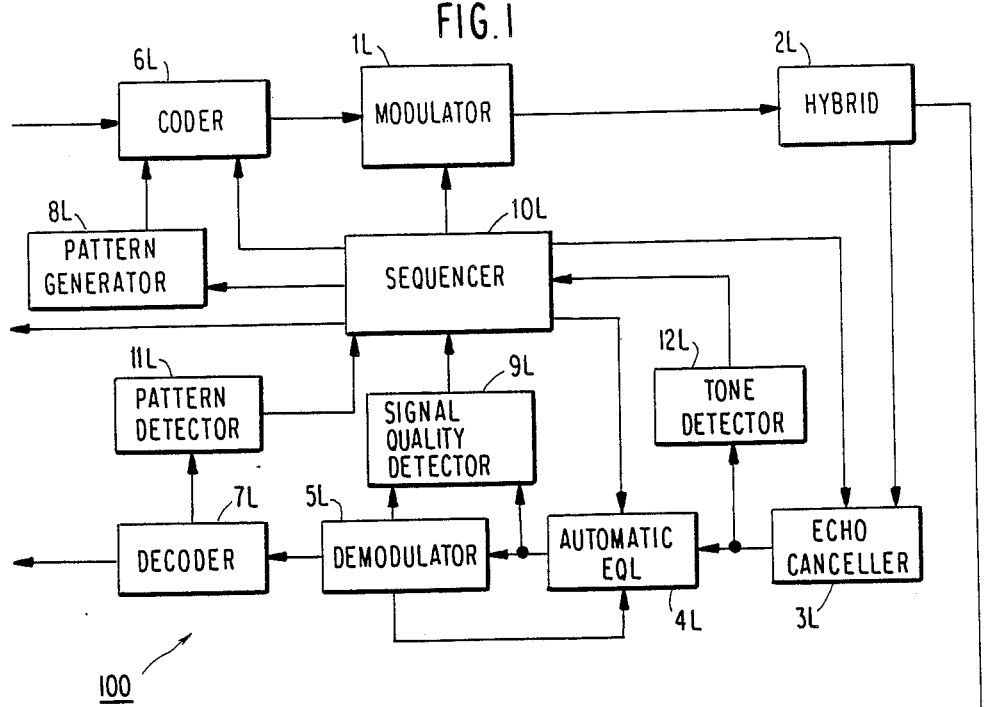
FIG. 1 is a block diagram showing full duplex modems to which the retrain method of the invention is applicable.
Figure 1:
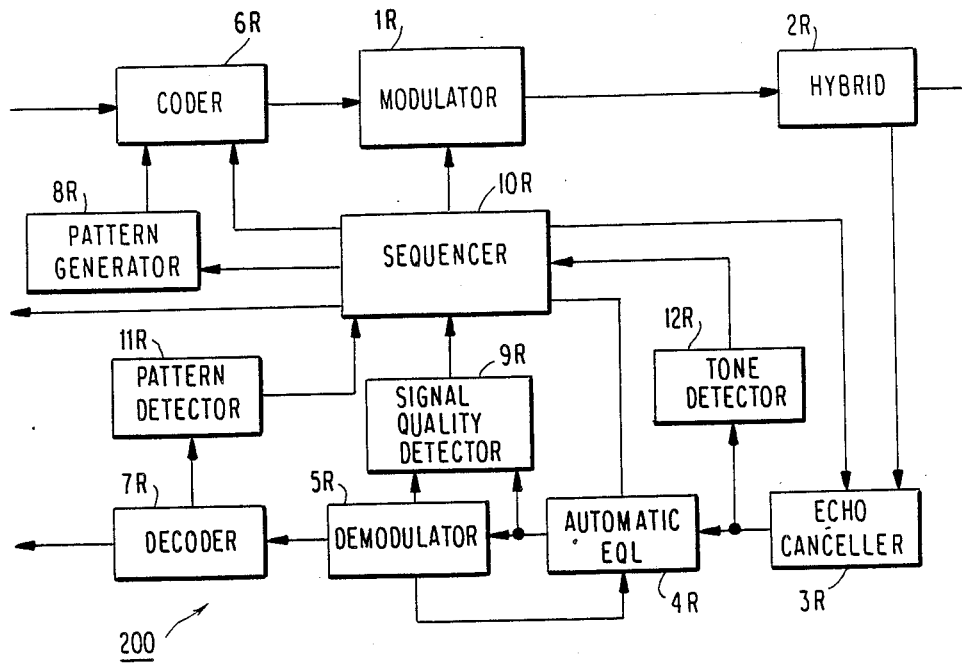

FIG. 1 is a block diagram showing modems based on Recommendation V. 32 (noted above) to which the retrain method is applicable. In a local modem 100, the transmission data is modulated, for example, using a quadrature amplitude modulation scheme, by a modulator 1L, and the modulated signal thereof is fed to a transmission line 20 via a hybrid transformer 2L. A modulated signal from a remote modem 200 is supplied as a received modulated signal to an echo canceller 3L via a hybrid transformer 2R. As is obvious from the reference numeral of the hybrid transformers 2R and 2L in the remote and local modems, the letter L is prefixed to hardware in the local modem while the letter R is prefixed to hardware in the remote modem. The echo canceller 3L cancels out of the received modulated signal an echo which occurs when the modulated signal is transmitted through the hybrid transformer 2L. The output of the echo canceller is fed to an automatic equalizer 4L. The equalizer 4L equalizes distortion waveform in the echo cancelled signal to produce an equalized signal. The equalizer 4L also adjusts and optimizes its tap coefficients in response to a demodulated signal which produces 5L demodulates from the equalized signal. Similarly, a signal transmitted from the local modem 100 is demodulated by corresponding elements 3R, 4R and 5R in the remote modem 200.

For the details of these modems, including the modulators, demodulators, echo cancellers, equalizers and hybrid transformers, reference is made to an article entitled "Silencing Echoes on The Telephone Network", Proceedings of the IEEE, Vol. 68, No. 8, pp. 948-963, Aug. 1980.

The modems in FIG. 1 also include encoders (U.S. Pat. No. 4,077,021) 6L, 6R which convert transmission data into predetermined codes which are not prone to transmission errors and decoders 7L, 7R therefor. The above modems further include sequencers 10L, 10R for controlling the start-up procedure as defined by Recommendation V. 32, and the retrain procedure for the equalizers and cancellers; signal generators 8L, 8R for generating patterns and tones necessary for such procedures; signal quality detectors 9L, 9R for detecting deterioration of the receive modulated signals, pattern detectors 11L; 11R, and tone detectors 12L, 12R for detecting patterns and tones transmitted through the iine 20. The sequencers 10L, 10R respectively comprise a microprocessor which is programmed to execute the procedures according to Recommendation V.32. The pattern generators respectively comprise, for example, a ROM which produces a desired pattern using the signal from sequencers 10L, 10R as the address. The signal quality detectors 9L, 9R comprise comparators which compare the difference between the input at the demodulators 5L, 5R and the output thereof with a predetermined value. The pattern detectors 11L, 11R comprise plural comparators which respectively compare the outputs from the decoders 7L, 7R with predetermined patterns. The tone detectors 12L, 12R comprise filters which detect respective tones.

The retrain method of the invention will be described referring to FIG. 1 and the time chart in FIGS. 2A and 2B.

If it is assumed that the signal quality detector 9L in the local modem 100 detects deterioration, for example, in the form of an eye pattern at time $t_0$ during full duplex data transmission between the local and remote modems 100 and 200, the sequencer 10L responds to the deterioration detection signal by controlling the local data terminal equipment or local DTE (not shown) to suspend the transmission of data D. Then, the sequencer 10L controls the pattern generator 8L to sequentially generate a signal S indicating the reference timing for start-up of the retrain, a signal $\bar{S}$ in phase reversal, and a psuedo random signal TRN*. The signals S and $\bar{S}$ are identical to those defined by Recommendation V. 32, but the signal TRN* is set to have a shorter time period than that of Recommendation V. 32 signal TRN. When the tone detector 12R detects that the signal S from the local modem 100 has been received for a predetermined time period, it outputs a signal S detection signal. Dotted lines in FIG. 2 indicate that the signal S transmitted from the modem 100 arrives at the modem 200 after a delay TD and that the detector 12R detects the reception of the signal S for a predetermined period $T_1$. Responding to the signal S detection signal, the sequencer 10R controls the remote DTE (not shown) so as to suspend the transmission of data D. The sequencer 10R concurrently controls the pattern generator 8R to transmit the signals S, $\bar{S}$ and TRN* for retraining the equalizer 4L. The equalizers 4L, 4R respectively conduct training in their own modems with signals S, $\bar{S}$ and TRN* transmitted from opposite modems or, in other words, adjust their respective tap coefficients. After the transmission of the training signll TRN*, the sequencer 10L transmits a rate signal $R_1$ for indicating receivable bit rates and further transmits a signal $E_1$ indicating the highest bit rate among the receivable bit rates indicated by the rate signal $R_1$. For example, if the bit rates receivable by the local modem 100 are 9600 bit/s, 4800 bit/s and 2400 bit/s, the sequencer 10L indicates that three bit rates are receivable by setting the three predetermined bits in the rate signal $R_1$ at "1" respectively, and indicates the highest bit rate by setting one predetermined bit of the signal $E_1$ at "1". The signals R and E are defined by Recommendation V. 32. The sequencer 10R of the remote modem 200 judges the received data signal $R_1$ and transmits a bit rate signal $R_2$ which indicates what bit rates the remote modem 200 can receive and a signal $E_2$ indicates the highest bit rate. The sequencers 10L and 10R respectively transmit signals $B_1$ which condition descramblers of opposite modems for a predetermined time, and then control the local and remode DTE to resume the transmission of data D.

The pattern detector 11L makes the local DTE continue transmission of data D if the bit rate indicated by the signal $E_2$ sent from the sequencer 10R coincides with that of the signal $E_1$. In this case, the duration during which the transmission of data D from the local modem 100 is suspended extends only from the time $t_0$ to the time $t_1$. If the bit rates indicated in signals $E_1$ and $E_2$ differ from each other, as shown by the arrow 51, the sequencer 10L controls the local DTE to again suspend the transmission of data D after the delay TD, and controls the pattern generator 8L to transmit the signals S, $\bar{S}$, and TRN* for training. The sequencer 10L sends back the signals $R_3$ and $E_3$ if transmission is possible at the bit rate indicated by the signal $E_2$, and then controls the local DTE to send the signal $B_1$ at the above bit rate to resume the transmission of data D. The suspension time of data transmission at the local modem 100 is substantially from time $t_0$ to time $t_2$.

In the case where no signals for training such as the signal S are sent from the remote modem 200 to the local modem 100 after a predetermined time from the time $t_1$, it is judged that the recovery from unsatisfactory condition is impossible by simply retraining the automatic equalizers alone, and the procedure is then advanced to the conventional retrain procedure provided by Recommendation V. 32.

As described in the foregoing, according to the retrain method of this invention, the retrain of equalizers alone is possible instead of the retraining of both equalizers and echo-cancellers as is are conventionally required. Therefore the time required for the resumption of data transmission can be considerably reduced.

What is claimed is:

1. A retrain method for first and second modems operatng in a full duplex data transmission mode via a two wire circuit, each of the first and second modems including modulating means for modulating input data to produce a modulated signal, and echo canceller for cancelling an echo produced in response to the modulated signal, an equalizer for equalizing waveform distortion produced on a received modulated signal transmitted through a transmission line, and demodulating means for demodulating the received modulated, equalized signal into the input data, said retrain method comprisng the steps of:
   detecting deterioration of the received modulated signal from said second modem,
   suspending data transmission from said first modem in response to the detection of deterioration and transmitting, at least once, a first training signal having a predetermined pattern and time period,
   suspending data transmission from said second modem in response to said first training signal and transmitting, once, a second training signal having a predetermined pattern and time period, and
   automatically training only said equalizers of said first and second modems in response to the second and first training signals, respectively.

2. The automatic retrain method as claimed in claim 1 wherein said first and second training signals include a signal indicating a reference timing, a random signal for training, rate signals for indicating possible transmission rates, a maximum rate signal indicating a maximum bit rate, and a signal for conditioning scramblers.

3. A retrain method for first and second modems arranged for full duplex data transmission via a two wire circuit, said modems being of the type including echo cancellers and distortion equalizers, comprising:
   detecting deterioration of a signal received at said first modem;
   suspending signal transmission from said first modem;
   transmitting a first retrain signal from said first modem;
   suspending signal transmission from said second modem;
   transmitting a second retrain signal from said second modem; and
   automatically training only equalizers of said first and second modems in response to said second and first retrain signals, respectively.

4. The automatic retrain method of claim 3, further comprising the step of reading said second retrain signal at said first modem, and, if a selected portion of said second retrain signal does not match a selected portion of said first retrain signal, transmitting a modified first retrain signal from said first modem.

5. The automatic retrain method of claim 3, wherein if said first modem fails to detect said second retrain signal for a predetermined time after transmitting said first retrain signal, automatically retraining both said automatic equalizers and echo cancellers of said first and second modems.

* * * * *

UNITED STATES PATENT AND TRADEMARK OFFICE
CERTIFICATE OF CORRECTION

PATENT NO. : 4,792,940

DATED : December 20, 1988

INVENTOR(S) : HIRAGUCHI MASAYOSHI, Tokyo JAPAN

It is certified that error appears in the above-identified patent and that said Letters Patent is hereby corrected as shown below:

Column 1, line 25, delete "retrain" and insert --retraining--.

Column 1, line 31, delete "prio" and insert --prior--.

Column 2, lines 22 and 23, delete "distortion waveform" and insert --waveform distortion--.

Column 2, line 26, delete "which produces 5L demodulates" and insert --which demodulator 5L produces--.

Column 2, line 49, delete "iine" and insert --line--.

Column 3, line 28, delete "signll" and insert --signal--.

Signed and Sealed this

Eighth Day of August, 1989

Attest:

DONALD J. QUIGG

*Attesting Officer*    *Commissioner of Patents and Trademarks*